W. T. NICHOLLS.
APPARATUS FOR FORMING GLASS TILES.
APPLICATION FILED SEPT. 18, 1907.

952,272.

Patented Mar. 15, 1910.

2 SHEETS—SHEET 1.

WITNESSES
R. A. Balderson
R. S. Little

INVENTOR
W<sup>m</sup> T. Nicholls,
by Bakewell, Byrnes & Parmelee
his Attys.

W. T. NICHOLLS.
APPARATUS FOR FORMING GLASS TILES.
APPLICATION FILED SEPT. 18, 1907.
952,272.
Patented Mar. 15, 1910.
2 SHEETS—SHEET 2.
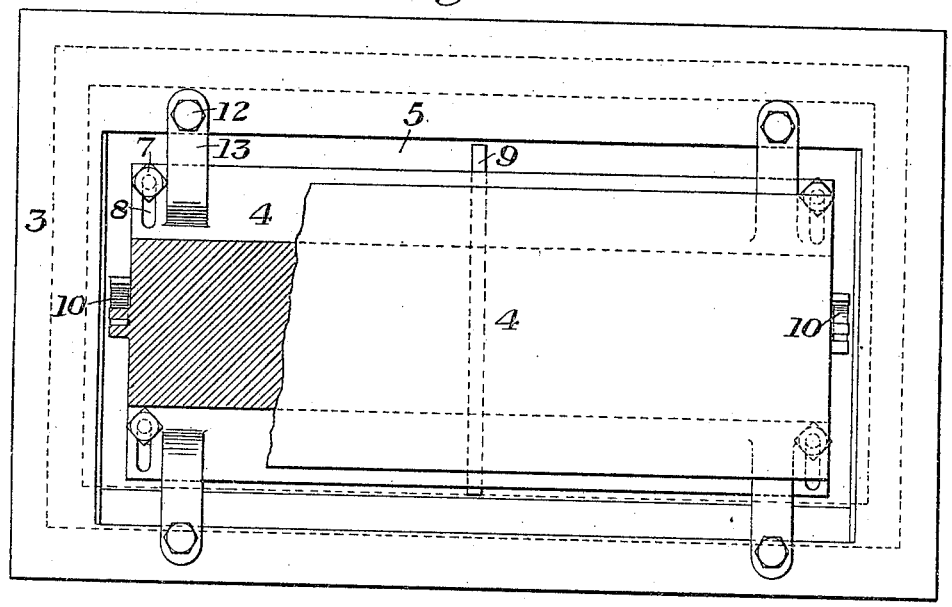
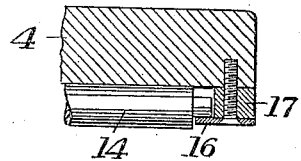
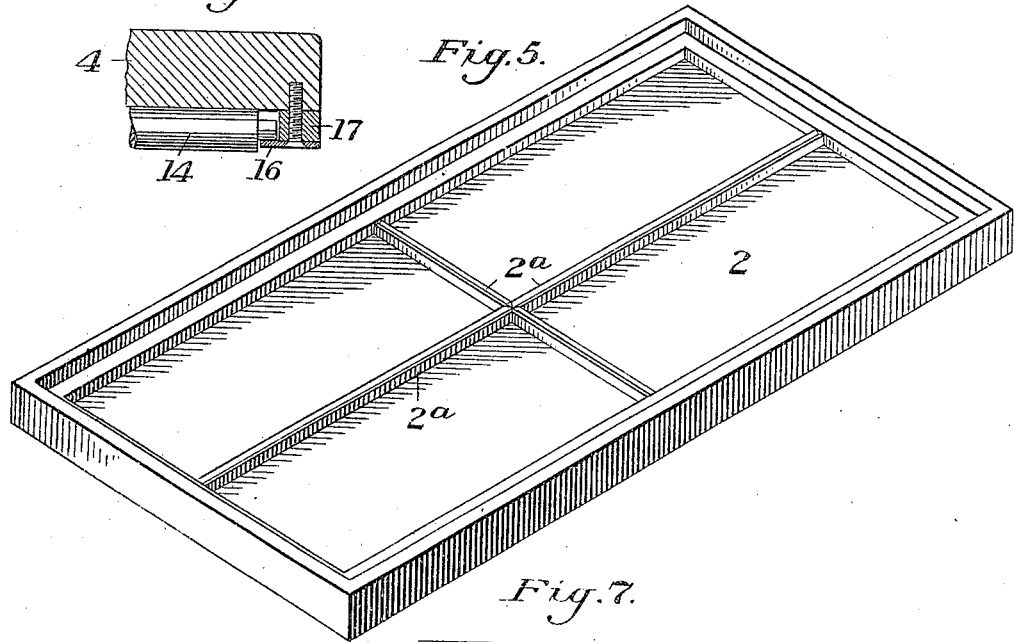
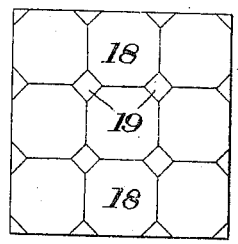
WITNESSES
R. A. Balderson
R. S. Little
INVENTOR
Wm. T. Nicholls
by Bakewell, Byrnes & Parmelee,
his Attys.

UNITED STATES PATENT OFFICE.

WILLIAM T. NICHOLLS, OF WELLSBURG, WEST VIRGINIA.

APPARATUS FOR FORMING GLASS TILES.

952,272.  Specification of Letters Patent.  Patented Mar. 15, 1910.

Application filed September 18, 1907. Serial No. 393,491.

*To all whom it may concern:*

Be it known that I, WILLIAM T. NICHOLLS, of Wellsburg, Brooke county, West Virginia, have invented a new and useful Apparatus for Forming Glass Tiles, of which the following is a full, clear, and exact description, reference being had to the accompanying drawings, forming part of this specification, in which—

Figure 1:
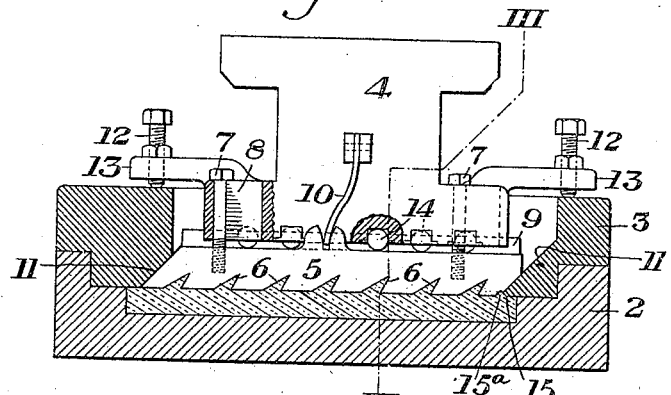
Figure 2:
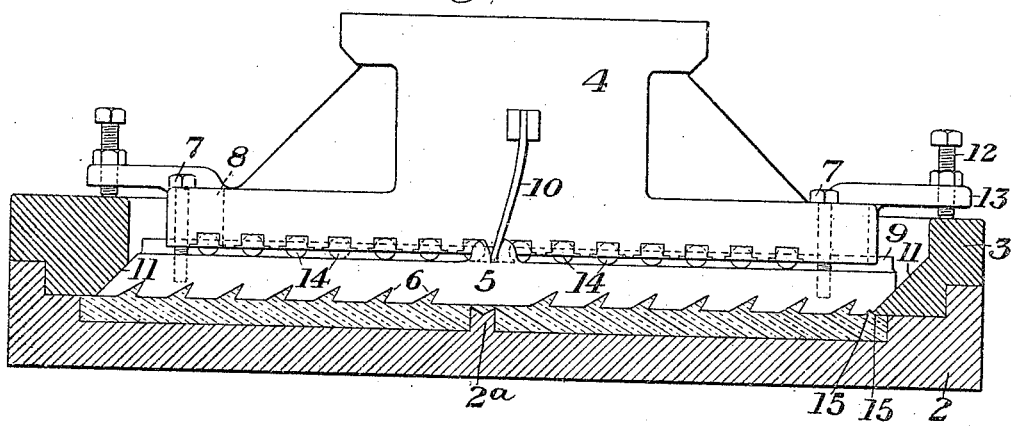
Figure 3:
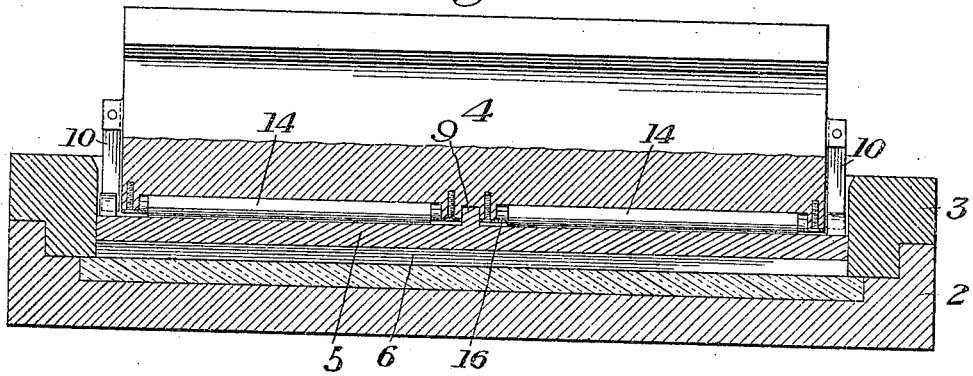

Figure 1 is a view partly in section and partly in side elevation of a mold box and plunger embodying my invention; Fig. 2 is a similar view showing a modification; Fig. 3 is a section on the line III—III of Fig. 1; Fig. 4 is a plan view partly broken away; Fig. 5 is a perspective view showing the modified form of mold box; Fig. 6 is a detail view hereinafter referred to; and Fig. 7 is a plan view showing other forms of tile which may be made.

My invention has relation to the manufacture of glass tiles of that class which are provided on their under surface with a plurality of continuously extending parallel undercut ribs or projections, by means of which the tiles are anchored in their setting.

The present invention is designed to provide means whereby tiles of this character can be simply and rapidly manufactured by pressing in a mold.

The precise nature of my invention will be best understood by reference to the accompanying drawings, which will now be described, it being premised, however, that various changes may be made in the details of construction and arrangement without departing from the spirit and scope of my invention as defined in the appended claims.

Referring to the accompanying drawings, the numeral 2 designates an open-top mold box, which is provided with a removable overhanging top ring 3 seated upon the upper edge of the box proper. This box, together with the ring, may be in general of any well-known construction.

4 designates a plunger which may be operated in any usual manner.

5 is a pressing plate having a flat bottom surface formed with parallel series of undercut notches or recesses 6, which extend across its face. This pressing plate is connected with the plunger in such a manner as to move vertically therewith and to be also capable of a reciprocating movement in a horizontal plane with reference to the plunger and mold. In the drawing I have shown it as supported from the plunger by means of bolts 7 which pass through slots 8 in the bottom flange portion of the plunger. The pressing plate is provided on its upper surface with one or more guiding ribs or lugs 9, which fit neatly but loosely in a guide groove cut in the bottom of the plunger. The pressing plate is normally held in position to enter the top of the mold by means of the springs 10. For the purpose of reciprocating the presser plate horizontally as it enters and leaves the molds, the mold ring is provided with the inclined or cam surfaces 11 which are arranged to be engaged by corresponding surfaces on the presser plate.

12 designates adjustable stop screws, which are carried by lugs 13 attached to the plunger, and which by their engagement with the upper surface of the mold ring limit the extent to which the plunger and its pressing plate enter the mold. For the purpose of reducing friction, a series of antifriction balls or rollers 14 are preferably interposed between the pressing plate and plunger.

The operation is as follows: A bath of hot glass is placed in the mold cavity of the mold box. The plunger is then operated, the pressing plate entering the mold box through the top ring into contact with the glass and being moved horizontally by the engagement of its cam surfaces with the cam surfaces 11 of the top ring. The body portion of the tile is thus pressed to shape, and the glass enters the undercut notches or recesses 6 to form the parallel ribs or projections. As the plunger is withdrawn from the mold box, the pressing plate is moved back by the action of the cam surfaces, to clear these ribs or projections. The projection at one side of the top ring which provides the cam surface 11, and which overhangs the mold cavity is protected against the cutting action of the glass by having its edge portion truncated or cut away as shown at 15. The under face of the pressing plate has formed therein a slight V-shaped depression $15^a$ at that side thereof which engages this inclined surface 11. It will be understood that as the pressing plate enters the mold in contact with the hot glass, this depression serves to prevent the glass from working or cutting its way outwardly between the inclined cam surfaces, as it would otherwise tend to do, such cutting action in practice being quite rapid.

In the modification shown in Fig. 2, the mold box 2 is shown as provided with a central partition 2ª, which extends across the mold cavity in a direction parallel to the undercut recesses in the pressing plate. This is for the purpose of enabling two tiles to be pressed by the same operation. In fact, the mold box may be provided with a number of these partitions for forming two or more tiles at the same operation.

In Fig. 5, I have shown the mold box divided for forming four tiles, and other arrangements of the partitions may be made. In the operation of this form of mold, a batch of glass is placed in the mold directly over the partitions, and the pressing operation is effected in the same manner as above described. So far as this part of my invention is concerned, however, it is immaterial what may be the particular construction of the plunger, as the latter may be constructed as shown in my pending application, Serial Number 369,300, filed March 20, 1907, in which the undercut recesses or projections are formed directly in the lower face of the plunger, means being provided for effecting a relative lateral movement of the plunger and mold sufficient to enable the plunger to disengage the undercut ribs or projections on the formed tile.

There are several important advantages in forming two or more tiles at the same operation, one of them being, of course, the more rapid production which is thus made possible. A further advantage is that the partition or partitions in the mold act to break up the flow of glass in such a manner that the formation of the usual rings or wrinkles on the lower surface of the tiles is obviated. A further advantage is that I am enabled to press tiles in this manner of shapes and dimensions which can not well be pressed singly. Thus, if it be attempted to press singly a tile having a length out of proportion to its width, such as a three inch by nine inch tile, it is exceedingly difficult to get a proper flow or distribution of the glass. Two or more such tiles may, however, be readily pressed side by side. I can also press floor tiles, such as shown in Fig. 7, one or more large tiles 18 and one or more small tiles 19 being formed at the same time. This affords a large saving both in time and glass. A still further advantage is that any excess of glass in one division of the mold will flow over the top of the division wall under the pressing action of the plunger into another division or divisions, the partition walls being of less width than the thickness of the body portion of the tile, and the two or more tiles being connected by thin webs or necks of glass extend over these partitions. The tops of the partitions are preferably of the V-form shown in Figs. 2 and 5, so that the thinnest portions of these connecting webs will be at the edges of the tile. The tiles can then be very easily separated. This separation will, of course, leave an unfinished edge at these points. These edges, however, can be finished by very slight grinding.

The anti-friction rollers 14 may be seated in recesses in the bottom of the plunger upon bearing tracks 16, as shown in Fig. 6. The grooves for the series of rollers can be closed at the ends by keeper plates 17.

The advantages of my invention result from the provision of the laterally or horizontally movable pressing plate, together with means for reciprocating the same, whereby lateral motion of the plunger as a whole, or of the mold box, is avoided; also from the provision of means whereby two or more tiles can be simultaneously formed in the manner described.

I claim:—

1. In apparatus for the manufacture of tiles, having undercut projections, a mold box having a bottom and fixed side walls, a plunger and a pressing plate carried thereby, and both adapted to enter the top of the box, the said plate being capable of reciprocating movement on the plunger; substantially as described.

2. In apparatus for the manufacture of tiles, having undercut projections, a mold box having an open top, and a fixed bottom, a plunger adapted to enter the box from the top, and a pressing plate carried by the plunger and movably connected with the plunger so as to reciprocate at an angle thereto, said plate having undercut recesses in its lower face; substantially as described.

3. In apparatus for the manufacture of glass tiles, a mold box having a fixed bottom and a top ring, a presser plate adapted to enter the mold box from the top, a vertically movable plunger which carries the pressing plate and to which said plate is connected so as to reciprocate at an angle thereto, and cam means for moving said plate as it enters and leaves the mold; substantially as described.

4. In apparatus for the manufacture of glass tiles having undercut projections, a mold box having a fixed bottom and a removable top ring, a presser plate having a series of undercut recesses in its lower face and adapted to enter the mold box through the top ring, a plunger or carrier to which the pressing plate is secured so as to reciprocate at an angle thereto, and cam means on the pressing plate and top ring for effecting a reciprocating movement of the presser plate; substantially as described.

5. In apparatus for forming glass tiles, a mold box having a fixed bottom and a removable top ring, a vertically movable plunger adapted to enter the mold box through the top ring, a pressing plate attached to the plunger so as to reciprocate thereon and having undercut recesses in its lower face, and stop means for limiting the pressing action of said plate; substantially as described.

6. In apparatus for the manufacture of glass tiles, a mold box having a fixed bottom a plunger arranged to enter said plate from the top, a presser plate carried thereby and connected thereto for independent reciprocating movement, and spring means for holding said plate in position to enter the mold; substantially as described.

7. In apparatus for the manufacture of glass tiles, a plunger, a horizontally movable pressing plate carried by the plunger, a mold box, and cam surfaces on the mold box engaged by the presser plate, the latter having a recess or depression adjacent to one of said cam surfaces; substantially as described.

8. In apparatus for the manufacture of tile, a mold box, a removable top ring therefor having an overhanging inclined flange or projection, and a horizontally movable pressing plate having a cam surface adapted to engage said projection, and also having a recess or depression adjacent to such cam surface; substantially as described.

9. In apparatus for the manufacture of tiles, a pressing member having a plurality of undercut recesses in its pressing face, and also having a relatively small recess in its pressing face adjacent to one side thereof; substantially as described.

10. In apparatus for the manufacture of glass tiles, an open top mold box, a pressing member arranged to enter said box from the top and to move in approximately a vertical line and means to give a horizontal movement to the pressing member during its vertical movement; substantially as described.

11. In apparatus for the manufacture of glass tiles, a mold box having a partition extending across its interior, said partition being of such a height as to extend through the major portion of the thickness of the tile and provided with two cutting edges; substantially as described.

12. In apparatus for the manufacture of glass tiles, an open-top mold, and a pressing member arranged to enter said box from the top, said pressing member arranged to move vertically and horizontally with relation to the mold, said box having a transverse partition arranged to partially divide the tile from the portion overlying the partition from the under side thereof; substantially as described.

13. In apparatus for the manufacture of glass tiles, an open-top mold box or member, a pressing member arranged to enter said box from the top in approximately a vertical line, and means to move the pressing member into and out of the box, said box having a partition therein, the upper edge of which is slightly below the top edges of the sides thereof, and means to give a horizontal movement to the pressing member during its vertical movement; substantially as described.

14. In apparatus for the manufacture of glass tiles, an open top mold box member, a pressing member arranged to enter said box from the top in approximately a vertical line, means to move the pressing member into and out of the box, the said member having undercut recesses in its forming face, and means for effecting a relative lateral movement between the box member and pressing member as the latter moves to and from its pressing position, the relatively stationary one of said members having a cutting partition arranged to partially sever the tile from one of its faces and through the major portion of the thickness of the tile; substantially as described.

15. In apparatus for the manufacture of glass tiles, an open-top mold box or member, a pressing member arranged to enter said box from the top in approximately a vertical line, means to move the pressing member into and out of the box, and having undercut recesses on its forming face, said box having a partition therein, the upper edge of which is slightly below the top edges of the sides thereof, and means to give a horizontal movement to the pressing member during its vertical movement while pressing the tile; substantially as described.

In testimony whereof, I have hereunto set my hand.

WILLIAM T. NICHOLLS.

Witnesses:
LAWRENCE LEE,
H. M. CORWIN.